United States Patent [19]

Heinemann et al.

[11] 4,322,116
[45] Mar. 30, 1982

[54] HYDRODYNAMIC BEARING

[75] Inventors: Otto Heinemann, Ennigerloh; Helmut Lucke, Beckum; Werner Schobler, Ahlen; Burkhard Heiringhoff, Oelde; Helmut Krumme, Wadersloh, all of Fed. Rep. of Germany

[73] Assignee: Krupp Polysius AG, Fed. Rep. of Germany

[21] Appl. No.: 171,471

[22] Filed: Jul. 23, 1980

[30] Foreign Application Priority Data

Aug. 20, 1979 [DE] Fed. Rep. of Germany ....... 2931383

[51] Int. Cl.$^3$ ............................................. F16C 32/06
[52] U.S. Cl. ........................................ 308/9; 308/73; 308/122
[58] Field of Search ............... 308/9, 73, 122, DIG. 1, 308/160, 170

[56] References Cited

U.S. PATENT DOCUMENTS 3,917,365  11/1975  Jenness ................................ 308/73
3,944,304   3/1976  Purtschert ........................... 308/122
3,994,541  11/1976  Geary et al. ........................ 308/122
4,215,903   8/1980  Andrews .............................. 308/9

Primary Examiner—Lenard A. Footland
Attorney, Agent, or Firm—Learman & McCulloch

[57] ABSTRACT

A hydrodynamic bearing for supporting a rotary member has a bearing gap between the rotary member and the bearing and which is occupied by fluid. Hydrodynamic pressure in the gap is monitored by a sensor which is coupled to a starting aid that is responsive to variations in the hydrodynamic pressure to switch on and off a starting aid. Upon being switched on the starting aid is operable to deliver additional fluid to the bearing gap.

11 Claims, 4 Drawing Figures

HYDRODYNAMIC BEARING

BACKGROUND OF THE INVENTION

This invention relates to a hydrodynamic bearing comprising at least one bearing shoe with a lower part and an upper part tiltably and rotatably supported thereon and further comprising a starting aid in the form of a device designed to be switched on and off for producing a hydrostatic pressure in the bearing gap.

In contrast to hydrostatic plain bearings, to which the pressure medium has to be supplied under certain minimum pressure, the pressure medium required for producing a hydrodynamic pressure in the bearing gap in the case of a hydrodynamic plain bearing may be delivered to the bearing surface in the absence of pressure or in the substantial absence of pressure, because by virtue of the geometry of the upper part of the bearing shoe the hydrodynamic pressure is built up by a wedge-shaped layer of pressure medium.

One major disadvantage of known hydrodynamic bearings is that, in many cases, only a relatively thin layer of pressure medium or lubricant can be built up in operation between the bearing surface and the rotating element to be supported, i.e., in the bearing gap, which can have an unfavorable effect, particularly during the startup of the rotating element to be supported and, in some cases, also with relatively slowly rotating, large machine parts. Attempts have been made to obviate these disadvantages by associating with hydrodynamic bearings additional devices which are intended in particular to serve as starting aids and which are designed to be switched on and off during the startup phase to produce a hydrostatic pressure in the bearing gap. In this connection, it is known that the switching-on and switching-off of the starting aid may be controlled through a temperature monitor. However, a control arrangement such as this has proved to be problematical in practice on account of its relatively high inertia (time delay).

SUMMARY OF THE INVENTION

An object of the present invention is to provide a hydrodynamic bearing of the type mentioned hereinbefore which, despite its simple and reliable construction, is distinguished by a relatively quick-response control facility for switching the starting aid on and off.

According to the invention, this object is achieved in that the device serving as the starting aid is designed to be switched on and off in dependence upon the hydrodynamic pressure prevailing in the bearing gap.

This embodiment according to the invention makes use of the knowledge that, and specifically for each hydrodynamic bearing or each hydrodynamic bearing shoe, a certain hydrodynamic pressure is intended for a certain height of the lubricating gap (between the bearing surface and the rotating element to be supported). If the height of the lubricating gap is reduced, for example at a certain point of the bearing surface, the pressure increases at that point.

The pressure in the film of lubricant may be measured or sensed at a certain point of the bearing surface (for example substantially at the middle of the support or at another suitable point) and may then be compared with a required value in a control system. Certain deviations from the required value may then be used as control pulses for switching the starting aid on or off.

In this way, any shortfall in the minimum height of the lubricating gap at the bearing surface of the bearing shoe can be detected very quickly, i.e., with hardly any dead time, by a simple pressure sensing or monitoring system and eliminated by switching-on of the starting aid (additional generation of a hydrostatic pressure in the bearing gap). In this way, the bearing shoe is prevented from accelerating or running hot, thereby increasing the operational reliabililty of the hydrodynamic bearing as a whole.

In one advantageous embodiment of the invention, the upper side of the upper part which forms the bearing surface of the bearing shoe is connected to its lower side by a connecting bore which is used for pressure relief of the mechanical support of the upper part on the lower part and to which a device for monitoring the hydrodynamic pressure in the bearing gap is connected, this pressure monitor being connected control-wise to the starting aid. Accordingly, the connecting bore provided in this embodiment may be used both for monitoring and controlling the starting aid and also for hydraulic pressure relief of the mechanical support of the upper part on the lower part. This hydraulic pressure relief of the mechanical support, together with the starting aid, contributes towards the extremely reliable operation of each bearing shoe and, hence, of the hydrodynamic bearing as a whole.

According to the invention, the connecting bore opens at its lower end into a pressure relief chamber which is machined into the upper side of the lower part of the bearing shoe and which is covered by the underneath of the upper part of the bearing shoe.

To ensure that the upper part supported on the lower part of the bearing shoe is capable of effectively tilting and rotating, it has proved to be favorable for the pressure relief chamber to be surrounded by a hemispherical annular supporting surface which cooperates with a similarly hemispherical, annular counter supporting surface correspondingly formed on the lower side of the upper part of the bearing shoe and which, with this counter supporting surface, forms the mechanical support of the bearing shoe.

In another embodiment of the invention, the annular supporting surface is preferably machined in concave form into the upper side of the lower part of the bearing shoe, while the counter supporting surface is produced in convex form on the underneath of a central part of the upper part of the bearing shoe which projects downwards like a journal.

In order to ensure that, in the hydrodynamic bearing according to the invention, the required hydrodynamic pressure can be built up without interference in the bearing gap, even despite the presence of the connecting bore and the pressure relief chamber, it is important that the pressure relief chamber should be tightly sealed off from outside. In another embodiment of the invention, this result is acheived by the fact that, of the mechanical support, at least the annular supporting surface machined into the lower part of the bearing shoe is lined with a covering containing polytetrafluoroethylene. This covering may be in the form of a fabric layer. In any event, this covering provides for adequate imperviousness given a uniform distribution of load, despite the hydraulic pressure relief required in this region.

It is quite generally pointed out at this juncture that, depending on its application, a hydrodynamic bearing according to the invention may be made up of a single bearing shoe or of several bearing shoes, several bearing shoes being arranged on an imaginary arc in adaptation to the circumference of the rotating element to be supported and at appropriate angular intervals from one another (in relation to the centre of the rotating element).

DESCRIPTION OF THE DRAWINGS

Preferred embodiments of the invention are described in the following with reference to the accompanying diagrammatic drawings, wherein.

DETAILED DESCRIPTION

Figure 1:
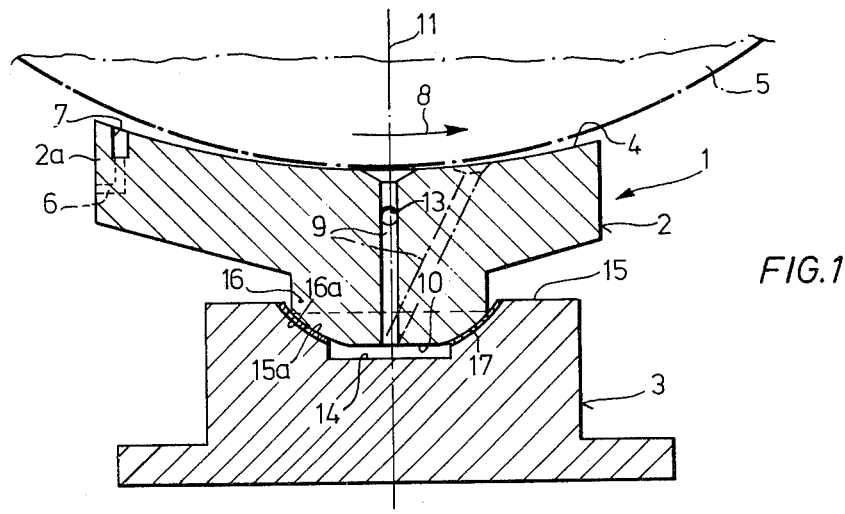
FIG. 1 is a vertical section through a first embodiment of a bearing shoe of the hydrodynamic bearing according to the invention.
Figure 2:
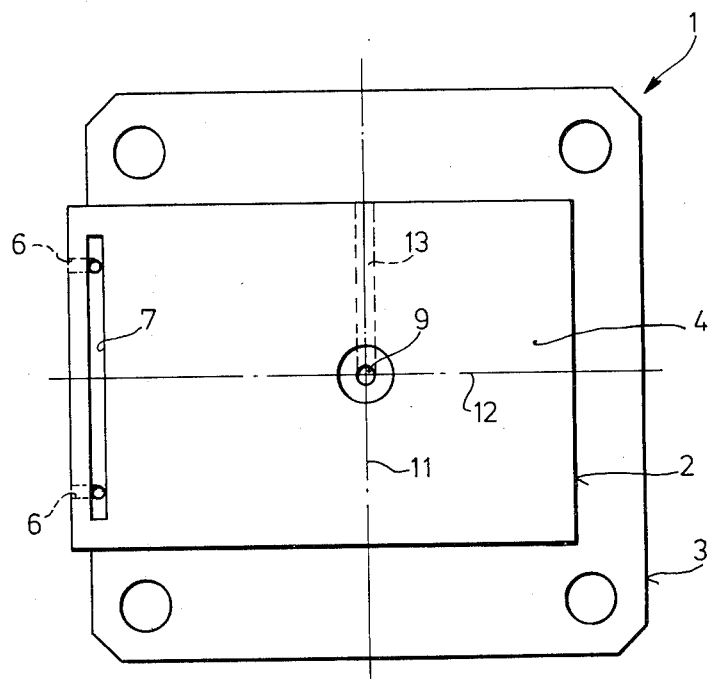
FIG. 2 is a plan view on the bearing shoe shown in FIG. 1.

The bearing shoe 1 shown in FIGS. 1 and 2 comprises an upper part 2 and a lower part 3 tiltably and rotatably or rockably supporting the upper part 2. The bearing surface 4 forming the upper side of the upper part 2 is intended hydrodynamically to support a rotating element 5 (shown only in dash-dot lines in FIG. 1). To this end, a hydraulic pressure medium or lubricant is delivered in the absence of pressure or in the substantial absence of pressure to a distributing groove 7 machined into the bearing surface 4 at one lateral edge through at least one (in this case through two) pressure medium connection 6 in communication with a source (not shown) of the medium of lubricant.

As can clearly be seen from the drawing, the upper part 2 of the bearing shoe is extended like a wing on one side transversely of the rotating element 5 to be supported, namely on that side 2a which is directed against the direction of rotation (arrow 8) of the rotating element 5, while at least the middle zone (looking in the transverse direction in FIG. 1) of the bearing surface 4 is approximately adapted to the peripheral form of the rotating element 5. Through this construction of the upper part 2 of the bearing shoe, a wedge-shaped layer of pressure medium decreasing in the direction of rotation (arrow 8) and, hence, the corresponding bearing gap can be formed between the rotating element 5 to be supported and the bearing surface 4. The size of the bearing gap formed is dependent on several factors, such as the geometry of the upper part 2 of the bearing shoe, and the rotational speed and the weight of the rotating element 5 to be supported.

A connecting bore 9 extends through the upper part 2 of the bearing shoe, connecting the bearing surface 4 to the lower side 10 of the upper part 2. This connecting bore 9 is used for the hydraulic pressure relief of the mechanical support of the upper part 2 on the lower part 3 and, at the same time, is connected to a device (to be explained hereinafter) for monitoring the hydrodynamic pressure prevailing in the bearing gap, this monitoring device being in turn connected control-wise to a device serving as a starting aid, which will also be explained hereinafter, and which is designed to be switched on and off in dependence upon the hydrodynamic pressure prevailing in the bearing gap in such a way that a hydrodynamic pressure may be additionally generated in the bearing gap as and when necessary.

As shown in FIG. 1, the connecting bore 9 extends substantially vertically through the upper part 2 of the bearing shoe, its central axis lying substantially on the vertical central plane 11 of the rotating element 5 to be supported and (looking down onto the upper part of the bearing shoe) substantially on the central longitudinal plane 12 of the bearing surface 4. However, this arrangement of the connecting bore 9 only applies to the case where the so-called "pressure peak" of the film of lubricant (thinnest point of the wedge-shaped film of lubricant formed between the bearing surface and the rotating element) is situated substantially in the region of the vertical central plane 11. If the upper part of the bearing shoe is shaped somewhat differently from that shown in FIG. 1, the lubricant "pressure peak" may even be formed with a slight lateral offset so that, as shown in dash-dot lines in FIG. 1, the upper opening of the connecting bore into the upper part of the bearing shoe (bearing surface) is offset in the direction of rotation of the member an amount commensurate with the development of the "pressure peak." The connecting bore itself then extends correspondingly obliquely of the pressure relief chamber 14.

In either case, the connecting bore 9 has a branch 13 which extends laterally outwards and which forms the connection for the above-mentioned pressure monitor.

FIG. 1 also clearly shows the mechanical support of the upper part 2 on the lower part 3, including the hydraulic pressure relief. To obtain the hydraulic pressure relief of the mechanical support, the connecting bore 9 opens at its lower end into a pressure relief chamber 14 which is machined into the upper side 15 of the lower part 3 of the bearing shoe and covered by the lower side 10 of the upper part 2 of the bearing shoe. The mechanical support itself is formed on the one hand by a hemispherical annular supporting surface 15a, surrounding the pressure relief chamber 14, in the upper side 15 of the lower part 3 and by a similarly hemispherical annular counter supporting surface 16a which is formed correspondingly thereto on the lower side 10 and which is produced in convex form on the underneath of a central part 16 of the lower part 3 of the bearing shoe which projects downwards like a journal. By contrast, the annular supporting surface 15a is machined to a concave, complementary form into the upper side 15 of the lower part 3 of the bearing shoe.

The lower part 3 of the bearing shoe is essentially in one piece and is fixedly mounted at its point of installation.

If, in a hydrodynamic (plain) bearing, only a single bearing shoe of the type described above is used, the above-mentioned starting aid (not shown in FIGS. 1 and 2) is connected through a pressure line (not shown) best containing a non-return valve and through the branch bore 13 to the connecting bore 9 (in the same way as the above-mentioned pressure monitor).

In the hydrodynamic bearing thus equipped, the actual dynamic pressure prevailing in the bearing gap is always determined and monitored, above all in operation, by means of the pressure monitor so that, in the event of deviations from a preset required value, the starting aid is switched on through the pressure monitor. In this way, an additional hydrostatic pressure is generated in the bearing, preventing the bearing from accelerating. If the bearing is to function reliably and if it is to be adapted to any deflections of the rotating element 5, it is important for the upper part 2 of the bearing shoe to be tiltably and rotatably supported on the lower part 3, which is ensured by the hemispherical annular supporting surface 15a, the corresponding counter supporting surface 16a and, additionally, by the hydraulic pressure relief via the connecting bore 9 and the pressure relief chamber 14.

To ensure that a satisfactory hydrodynamic pressure can be built up in the bearing gap in order to keep the hydrodynamic bearing fully functional, it is important that the annular supporting surface 15a and the counter supporting surface 16a should completely seal off the pressure relief chamber 14 surrounded by them from outside despite the necessary tiltability and rotatability. To this end, the annular supporting surface 15a machined into the lower part 3 of the bearing shoe is lined with a covering, for example a fabric covering 17, coated with polytetrafluoroethylene.

Figure 3:
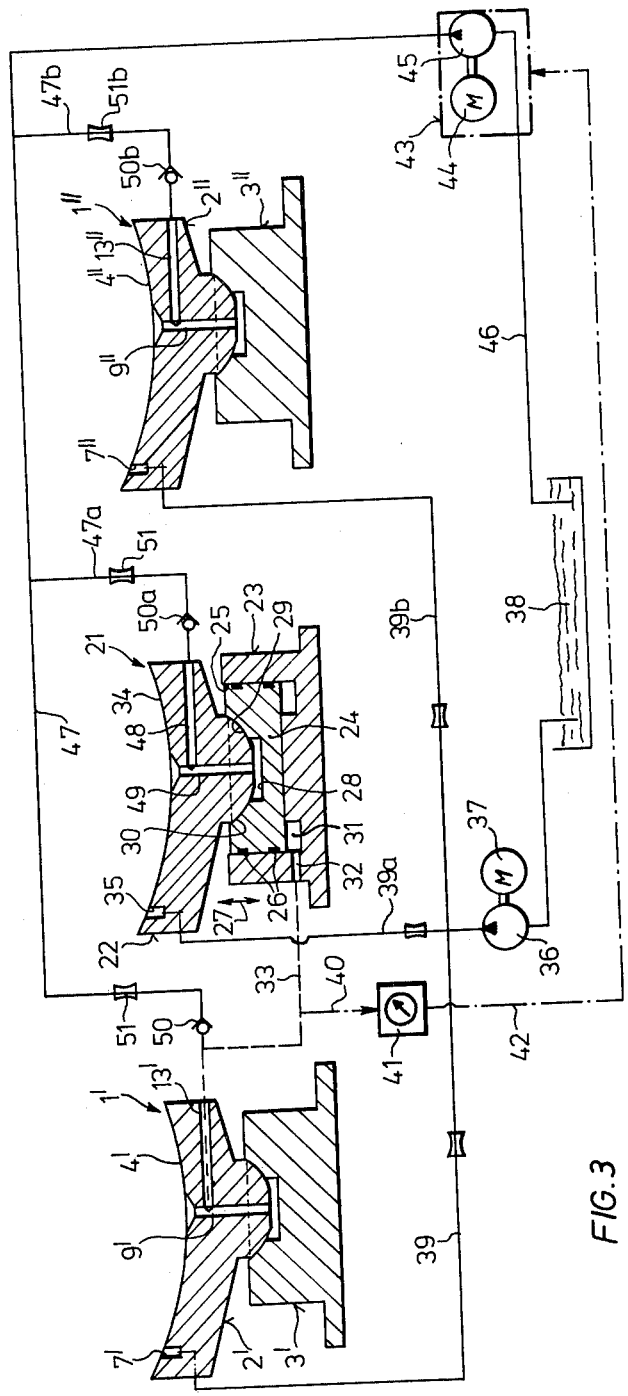
FIG. 3 shows an association of three bearing shoes of a hydrodynamic bearing, including the hydraulic line system.

It is particularly preferred for mounting relatively large rotating elements (for example heavy, largediameter rotary drums) to provide the hydrodynamic bearing with several bearing shoes. FIG. 3 shows an embodiment of a hydrodynamic bearing in which there are three bearing shoes 1', 1" and 21 of which two, in this case the outer two bearings 1' and 1", are constructed in exactly the same way as the bearing shoe 1 described with reference to FIGS. 1 and 2, i.e., with a one-piece, fixed lower part 3', 3" on which the upper parts 2', 2" of the bearing shoes are tiltably and rotatably supported. By contrast, the middle bearing shoe 21 (in FIG. 3) has a somewhat modified lower part 23, while its upper part 22 is constructed in exactly the same way as the upper part 2 of the bearing shoe shown in FIGS. 1 and 2.

Figure 4:
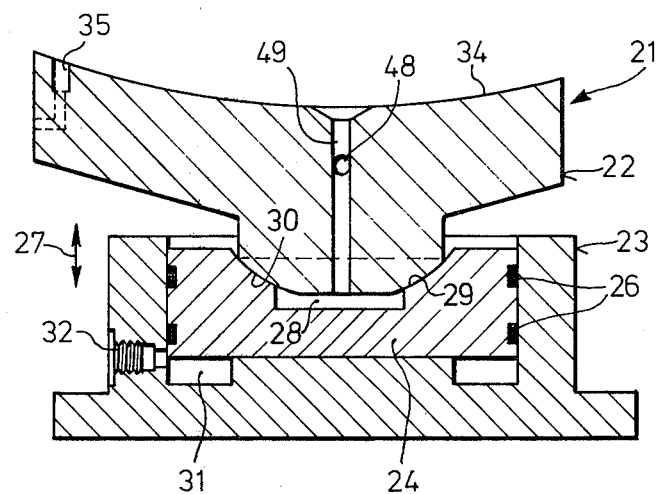
FIG. 4 is a vertical section similar to FIG. 1 and illustrating a modified bearing shoe.

As can be seen more clearly from FIG. 4, the lower part 23 of this third bearing shoe 21 (and any other bearing shoe that may be used in a hydrodynamic bearing of the type in question) accommodates a hydraulic piston 24 which is radially adjustable in relation to the rotating element (not shown) to be supported and which is sealingly (ring seals 26) guided in a cylindrical recess 25 in this lower part 23, being vertically displaceable in the directions of the double arrow 27. On its upper side, this hydraulic piston has a pressure relief chamber 28 similar to that explained with reference to FIG. 1, as well as a similar annular supporting surface of the lower part 23 on which the matching, similarly hemispherical annular counter supporting surface of the upper part 22 of the bearing shoe is supported in the same way as described with reference to FIG. 1.

On the lower side of the hydraulic piston 24 in the lower part 23 of the bearing shoe, there is a hydraulic pressure chamber 31 (preferably in the form of an outer annular chamber) which has an outwardly extending pressure connection 32.

As shown in FIG. 3, the hydraulic pressure chamber 31 communicates through its pressure connection 32, a pressure line 33 and the branch 13' of the connecting bore 9' present in the upper part 2' of the bearing shoe 1'. In this way, the lower side of the hydraulic piston 24 of the bearing shoe 21 may receive the same pressure which prevails in the connecting bore 9' of the bearing shoe 1', so that all the bearing shoes 1', 21 and 1" may always be automatically adjusted with equal load fractions.

In the example shown in FIG. 3, the bearing surfaces 4', 4" and 34 of the bearing shoes 1', 1" and 21 are all fed with pressure medium (generally oil) through their distributing grooves 7', 7" and 35 from a common supply pump 36 which is driven by a motor 37 and fed from a tank 38. As is generally the case with hydrodynamic bearings, the pressure medium is supplied to the bearing surfaces largely in the absence of pressure through pipes 39, 39a and 39b in which constrictions may optionally be present, as indicated.

The control system using the starting aid is also diagrammatically illustrated in FIG. 3. A control line 40 solely denoted by a dash-dot line is connected to the pressure line 33 connecting the connecting bore 9' of the bearing shoe 1' to the pressure chamber 31 of the bearing shoe 21 and leads to the pressure sensor or monitor 41 already explained earlier and which, in this case, merely detects the particular pressure prevailing in the bearing gap of the bearing shoe 1' and optionally relays corresponding control signals (through another control line 42) to the starting aid 43 so that the starting aid 43 may be switched on or off in dependence upon the hydrodynamic pressure prevailing in the bearing gap or gaps. This starting aid 43 contains a pressure-medium pump 45 which is driven by a motor 44 and of which the suction side may also communicate through a suction line 46 with the above-mentioned pressure-medium tank 38, while the pressure side of the pump 45 is also connected through pressure lines 47, 47a and 47b to the corresponding branches 13', 48, 13" of the associated connecting bores 9', 49, 9" of the three bearing shoes 1', 21 and 1". In addition, non-return valves 50, 50a and 50b and optionally constrictions 51, 51a and 51b (again only symbolized) are best arranged in these pressure lines 47, 47a and 47b. Accordingly, a hydrostatic pressure may be additionally generated in the bearing gap as and when required by means of the starting aid 43. In FIG. 3, the three bearing shoes 1, 1', 21 of the hydrodynamic bearing are arranged adjacent one another in a plane. In practice, however, the three bearing shoes are of course arranged on an imaginary arc at appropriate angular intervals in relation to the rotating elements to be supported.

The disclosure is representative of the preferred embodiment of the invention and is intended to be illustrative rather than definitive thereof. The invention is defined in the claims.

What is claimed is:

1. Hydrodynamic bearing apparatus for supporting a rotary member, said apparatus comprising a bearing shoe having a first part tiltably and rotatably supporting a second part adapted to confront said rotary member with a bearing gap between said member and said second part; starting aid means for delivering fluid to said bearing gap to generate hydrostatic pressure in said bearing gap; means for sensing hydrodynamic pressure in said bearing gap; and means coupling said sensing means and said starting aid means and responsive to changes in the hydrodynamic pressure in said bearing gap for switching such starting aid means on and off.

2. Apparatus according to claim 1 wherein said bearing gap communicates with a pressure relief port in said second part, said sensing means being coupled to said port.

3. Apparatus according to claim 2 wherein the coupling between said sensing means and said port includes a pressure line having a non-return valve means enabling fluid flow through said pressure line in a direction toward said port only.

4. Apparatus according to claim 3 wherein the coupling includes a branch within said second part and extending laterally outwardly from said port between the ends of the latter.

5. Apparatus according to claim 2 wherein said port communicates with said bearing gap in the region of minimum height of said gap.

6. Apparatus according to claim 1 including a pressure relief chamber between said first and second parts and in communication with said port.

7. Apparatus according to claim 6 wherein said pressure relief chamber is surrounded by a hemispherical angular supporting surface and a complementary countersupport surface formed on the confronting surfaces of the first and second members.

8. Apparatus according to claim 7 wherein said angular support surface is concave and is formed in said first part, and wherein said complementary countersupporting surface is concave and is formed on said second part.

9. Apparatus according to claim 1 wherein said first part comprises a piston reciprocably accommodated in a cylinder, and including means for effecting movements of said piston in said cylinder.

10. Apparatus according to claim 1 including a sealing member interposed between said first and second parts.

11. Apparatus according to claim 10 wherein said sealing means comprises polytetrafluoroethylene.

* * * * *